H. R. RICHARDS.
CHOCOLATE HEATER.
APPLICATION FILED OCT. 2, 1916.

1,239,218.

Patented Sept. 4, 1917.

WITNESSES:
Frank A. Fahle
Josephine Gasper

INVENTOR
Hugh R. Richards,
BY
Hood & Schley,
ATTORNEYS

UNITED STATES PATENT OFFICE.

HUGH R. RICHARDS, OF INDIANAPOLIS, INDIANA.

CHOCOLATE-HEATER.

1,239,218.   Specification of Letters Patent.   Patented Sept. 4, 1917.

Application filed October 2, 1916.   Serial No. 123,207.

*To all whom it may concern:*

Be it known that I, HUGH R. RICHARDS, a citizen of the United States, residing at Indianapolis, in the county of Marion and State of Indiana, have invented a new and useful Chocolate-Heater, of which the following is a specification.

In the manufacture of chocolate coated candy, the centers, such as creams and nuts, are dipped into the melted chocolate, which must be maintained in a uniform temperature for the production of the better candies.

It is the object of my invention to provide the heating arrangement for maintaining the chocolate at this uniform temperature, both in a central pot or reservoir and on the dipping pan or pans at the sides of such central pot or reservoir, and to obtain this heating in a uniform and perfectly controlled manner.

Figure 1:
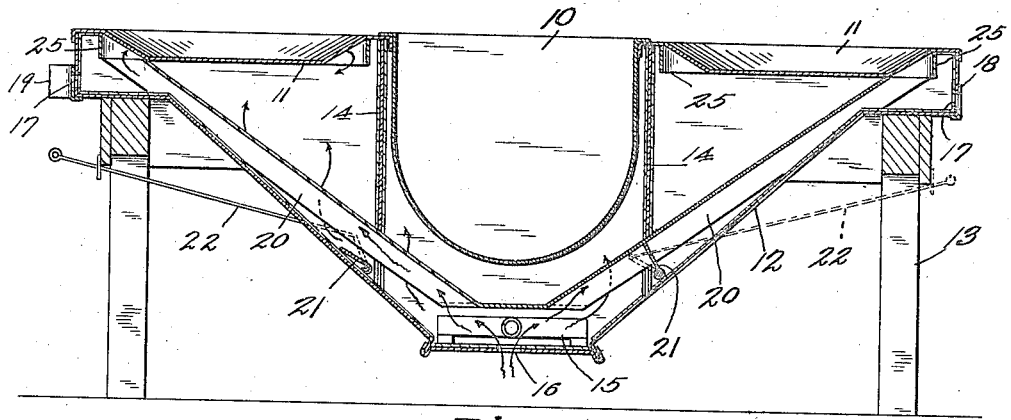
Figure 2:
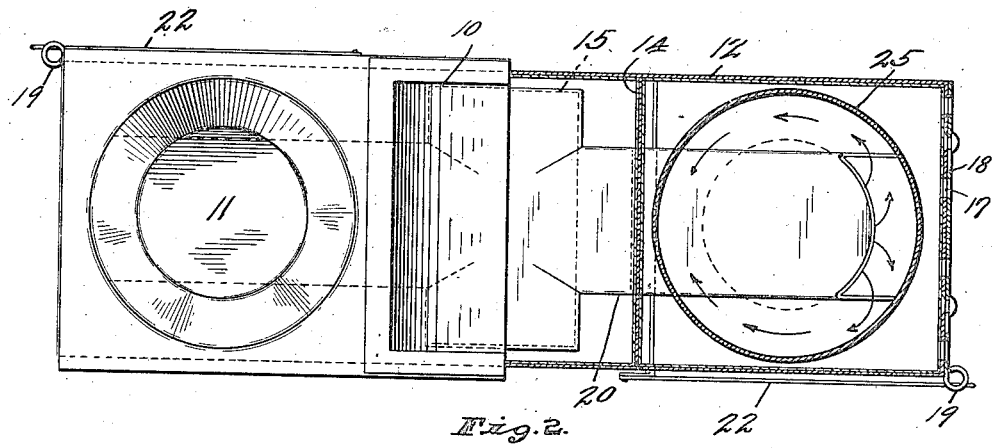
Figure 3:
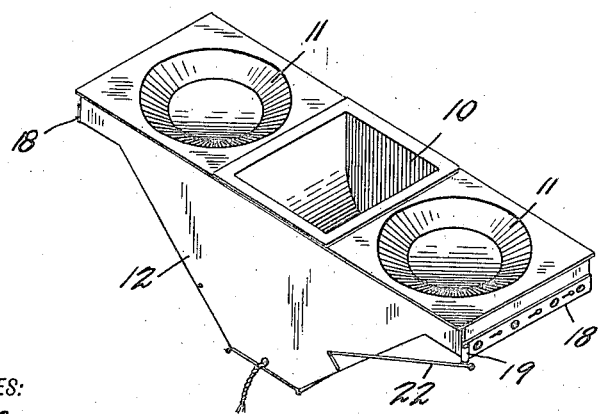

The accompanying drawing illustrates my invention. Figure 1 is a vertical longitudinal section of a chocolate table embodying my invention; Fig. 2 is a plan of such chocolate table in cross section; and Fig. 3 is a perspective view of the chocolate table, when moved from its supporting frame.

The chocolate table has a relatively deep chocolate pot or reservoir 10 at the middle, and a shallow dipping pan 11 at each end. These are supported in a sheet metal heating casing 12, resting in a suitable supporting framework 13. The casing 12 has vertical partitions 14 between the central pot 10 and the dipping pans 11 and with a bottom which is flat in the center and slopes upwardly toward the ends, this bottom being spaced from both the central pot 10 and the dipping pans 11. An electric heater 15 is mounted on the flat portion of the bottom of the casing 12, beneath the central pot 10, this heater being of any suitable type controlled in any suitable manner. The casing 12 is provided with air inlet openings 16 in its bottom, below the heater 15, and with air outlet openings 17 at the ends, the outlet openings being controlled by sliding dampers 18 which are operable by handle portions 19 at the left hand side of an operator standing at the end of the table, so that such operator can control such damper with her left hand, which is the one ordinarily kept free from chocolate during the dipping operation. The partitions 14 are not tight partitions, especially at the bottom, so that by the operation of the heater 15 air is drawn in through the openings 16 and heated and rises around the central pot 10 and the dipping pans 11.

In order to obtain a more nearly equal distribution of the heat, and to prevent freezing of the chocolate in the portions of the dipping pans near the ends of the table, I provide slanting flues 20, which are open downwardly and lead obliquely upward from the heater 15 to the under sides of the dipping pans 11 near the ends of the casing 12. These flues serve to carry part of the heated air rising from the heater 15 to those portions of the under faces of the dipping pan which are near the table ends; but not all the air is caught by these flues, so that other parts of the heated air rise into contact with the central pot 10 and the adjacent parts of the dipping pan. In addition to this convective heating, there is also radiation from the heater 15 to the central pot 10 and to some extent to the dipping pans. The amount of air which is carried upward along the flues 20 to the portions of the dipping pans near the ends of the table is controlled by dampers 21 in such flues 20, so as to permit a greater or less flow direct to the ends of the table, these dampers being controlled by sliding damper rods 22 which, like the handles 19, are arranged at the left of an operator standing at the end of the table so as to be operated by her left hand.

In operation, the main chocolate supply is contained in the central pot 10 and is dipped out on the dipping pans 11 as required. The heater 15 keeps the chocolate melted in the melting pot, and also keeps it melting in the dipping pans 11, the heat being distributed with practical uniformity throughout by reason of the flues 20 which lead to the ends of the table and the dampers 21 which control the amount of the air carried by such flues.

The dipping pans preferably have downwardly projecting flanges or collars 25 at their edges, to provide downwardly opening air-retaining pockets which guide and hold the hot air against the dipping pans at their edges where the tendency to chill is greatest.

I claim as my invention:

1. A chocolate table, comprising a casing, a chocolate pot mounted in such casing, a shallow dipping pan also mounted in said casing, a heater mounted in said casing below said chocolate pot, said dipping pan being displaced laterally from the heater, and a flue leading diagonally upward within the casing from said heater to that part of said dipping pan which is remote from the chocolate pot, and a damper in said flue.

2. A chocolate table, comprising a casing, a chocolate pot mounted in such casing, a shallow dipping pan also mounted in said casing, a heater mounted in said casing below said chocolate pot, said dipping pan being displaced laterally from the heater, and a flue leading diagonally upward within the casing from said heater to that part of said dipping pan which is remote from the chocolate pot.

3. A chocolate table, comprising a casing, a chocolate pot mounted in such casing, a shallow dipping pan also mounted in said casing, a heater mounted in said casing below said chocolate pot, and a flue leading from said heater to that part of said dipping pan which is remote from the chocolate pot, said flue being open on its under side and carrying but part of the hot air from the heater.

4. A chocolate table, comprising a casing, a chocolate pot mounted in such casing, a shallow dipping pan also mounted in said casing, a heater mounted in said casing below said chocolate pot, said dipping pan being displaced laterally from the heater, a flue leading diagonally upward within the casing from said heater to that part of said dipping pan which is remote from the chocolate pot, said casing having an air inlet opening below the heater and an air outlet opening beyond the discharge end of said flue, and a damper controlling one of such openings.

5. A chocolate table, comprising a casing, a chocolate pot mounted in such casing, a shallow dipping pan also mounted in said casing, a heater mounted in said casing below said chocolate pot, said dipping pan being displaced laterally from the heater, and a flue leading diagonally upward within the casing from said heater to that part of said dipping pan which is remote from the chocolate pot, said casing having an air inlet opening below the heater and an air outlet opening beyond the discharge end of said flue.

6. A chocolate table, comprising a casing, a chocolate pot mounted in such casing, a shallow dipping pan also mounted in said casing, a heater mounted in said casing below said chocolate pot, and a flue leading from said heater to that part of said dipping pan which is remote from the chocolate pot, said dipping pan having a downwardly projecting flange at its edge to provide a downwardly opening air-retaining pocket.

7. A chocolate table, comprising a casing, a chocolate pot mounted in such casing, a shallow dipping pan also mounted in said casing, a heater mounted in said casing below said chocolate pot, said dipping pan being displaced laterally from the heater, a flue leading diagonally upward within the casing from said heater to that part of said dipping pan which is remote from the chocolate pot, said casing having an air inlet opening below the heater and an air outlet opening beyond the discharge end of said flue, and a damper controlling said air outlet opening.

In witness whereof, I have hereunto set my hand at Indianapolis, Indiana, this twenty-eighth day of September, A. D. one thousand nine hundred and sixteen.

HUGH R. RICHARDS.

Copies of this patent may be obtained for five cents each, by addressing the "Commissioner of Patents, Washington, D. C."